April 29, 1969     W. F. KOLODZIEJ     3,440,813
ELECTROMAGNETIC VIBRATOR
Filed April 28, 1967
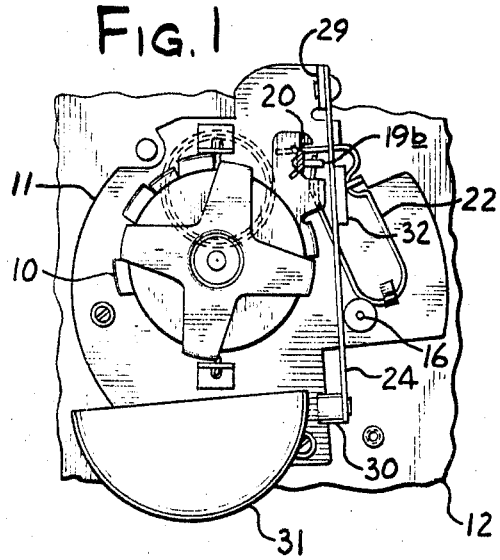
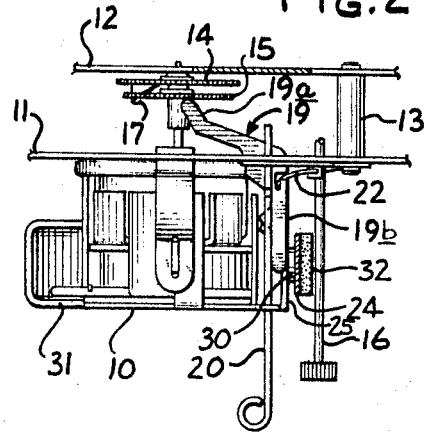
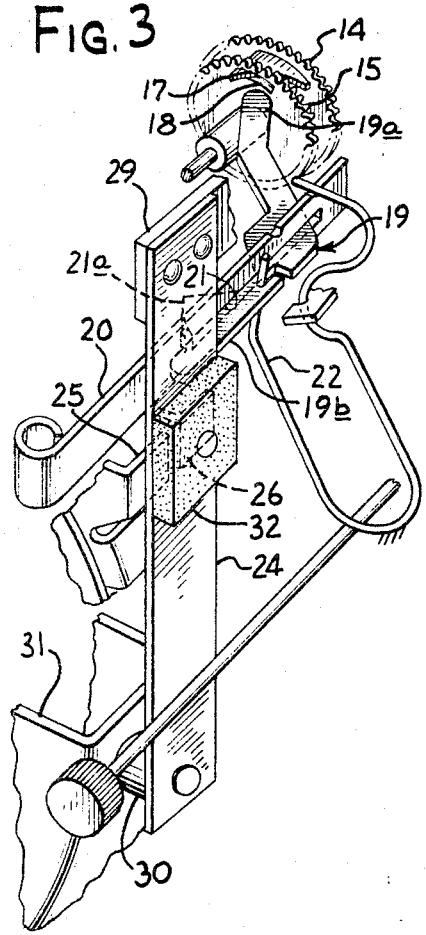
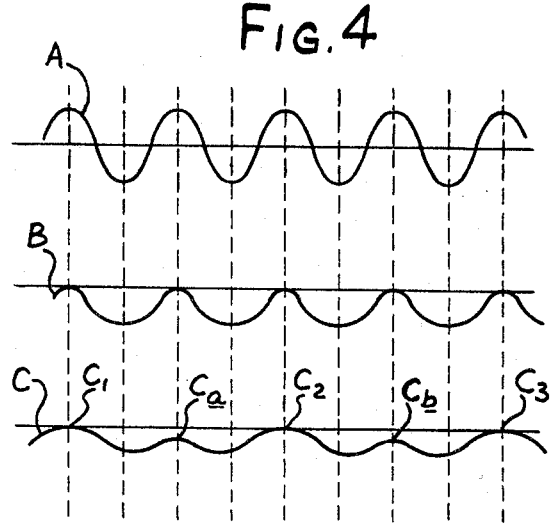
INVENTOR
WALTER F. KOLODZIEJ
by: Wolfe, Hubbard, Voit & Osann
ATTYS.

United States Patent Office 3,440,813
Patented Apr. 29, 1969

3,440,813
ELECTROMAGNETIC VIBRATOR
Walter F. Kolodziej, La Salle, Ill., assignor to General Time Corporation, Stamford, Conn., a corporation of Delaware
Filed Apr. 28, 1967, Ser. No. 634,687
Int. Cl. G04c 21/06
U.S. Cl. 58—38         4 Claims

ABSTRACT OF THE DISCLOSURE

An alarm system for electric alarm clocks, including an electromagnetic vibrator driven by a synchronous motor, with the vibratory element being driven by A.-C. flux from buzzer poles formed as integral parts of the synchronous motor. The electromagnetic vibrator acts as a frequency divider so that the striking frequency at the free end of the vibratory element is lower than the frequency at which a conventional buzzer alarm is driven. The first division is achieved by means of a permanent magnet mounted on the vibratory element adjacent the buzzer poles so as to reduce the frequency of the driving impulses to the same frequency as that of the A.-C. flux generated by the buzzer poles. Further frequency division may be achieved by designing the vibratory system to have a natural frequency of oscillation even lower than that of the frequency of the driving impulses, and preferably a sub-multiple of the frequency of the driving impulses.

---

The present invention relates generally to electromagnetic vibrators of the type used in alarm systems in synchronous motor-driven electric alarm clocks and, more particularly, to an alarm system including a frequency dividing electromagnetic vibrator driven by A.-C. flux from the same synchronous motor which drives the clock.

Frequency dividing electromagnetic vibrators have been proposed heretofore in which the frequency of the driving impulses derived from the A.-C. flux driving the vibrator is divided (to achieve a more desirable bell sound) by designing the vibratory system to have a lower natural frequency and greater amplitude than the driving impulses. Consequently, the frequency of the vibrator is largely determined by the natural frequency of the vibratory system, and the driving impulses derived from the A.-C. flux from the synchronous motor in effect serve both as synchronizing signals and as a power input to maintain the oscillatory motion of the vibratory system by replacing energy lost through friction and the like. However, while such devices are theoretically sound, it has been found that they are not sufficiently accurate and reliable under the operating conditions encountered in many practical applications. For example, such devices are easily disturbed by mechanical shocks and vibrations which are often encountered in actual operating environments, so that the resultant frequency varies considerably from the frequency for which the vibratory system is designed.

It is therefore, a primary objective of the present invention to provide an improved frequency dividing electromagnetic vibrator which provides a more accurate and reliable frequency division and thus a more reliable and consistant alarm sound, than has been achieved heretofore. A related object is to provide such an electromagnetic vibrator which is capable of maintaining the desired frequency division, and thus the desired frequency of the vibratory system, in the face of variable operating conditions encountered in actual use.

It is another object of this invention to provide a frequency dividing electromagnetic vibrator of the foregoing type which achieves a first frequency division at the point where the driving impulses are applied to the vibratory system.

A further object of the invention is to provide an improved frequency dividing electromagnetic vibrator which can be economically manufactured from a few low-cost parts.

Other objects and advantages of the invention will become apparent upon reading the following detailed description and upon reference to the drawings, in which:

FIGURE 1 is a rear plan view of an electric alarm clock driven by a synchronous motor and including an electromagnetic vibrator embodying the present invention;

FIG. 2 is a top view of the electric alarm clock shown in FIG. 1;

FIG. 3 is a perspective view of the alarm system included in the electric alarm clock of FIGS. 1 and 2, and embodying the present invention; and FIG. 4 is a series of representative waveforms illustrating the operation of the alarm system shown in FIGS. 1–3.

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

Turning now to the drawings, the illustrative electric alarm clock includes a conventional synchronous motor 10 mounted on the back of a mounting plate 11, which in turn is mounted on the back of a dial plate 12 and spaced therefrom by means of a plurality of spacer posts 13. Since electric alarm clock mechanisms are well known in the art, elements common to such clocks have been purposely omitted or shown simply diagrammatically. Thus, the synchronous motor 10 drives a conventional gear train (not shown) mounted between the mounting plate 11 and the dial plate 12 and including a pair of alarm control gear wheels 14 and 15. In order to pre-set the alarm for actuation at a preselected time while normally disabling the alarm, the forward gear wheel 14 is rotated by turning a manual control shaft 16 via alarm set knob so as to position a cam 17 on the back side of the forward gear wheel 14 relative to a cooperating slot 18 in the rear gear wheel 15. The rear wheel 15, which may be the hour wheel, is driven at a constant speed by the timing train, so that the slot 18 will always come into register with the cam 17 at a predetermined time, depending on the position at which the cam 17 is set. When the cam 17 and slot 18 are not in register, the cam serves to press the rear wheel 15 away from the forward wheel 14.

For the purpose of triggering the alarm mechanism for actuation at the pre-set time, a control lever 19 having a forward arm 19a and a rear arm 19b is pivoted on the mounting plate 11 so as to bias the read gear wheel 15 forwardly toward the forward wheel 14 when the lever 19 is in its advanced position. The lever 19 which is biased clockwise by a spring 22, is normally held in a retracted position by means of an alarm plunger 20 which serves to cam the rear arm 19b of the lever away from the motor 10, in a counterclockwise direction, thereby pivoting the lever about its pivot point on the mounting frame 11 to tilt the forward arm 19a of the lever rearwardly away from the gear wheel 15. When the alarm plunger 20 is retracted to trigger the alarm mechanism for actuation at a pre-set time, a slot 21 in the plunger comes into register with a projection 21a on the rear arm 19b of the lever so as to permit the lever to pivot in a clockwise direction to an intermediate or trigger position where the forward arm 19a bears against the back side of the gear wheel 15 under the urging of the lever bias spring 22.

At the pre-set time, the slot 18 in the wheel 15 rotates into register with the cam 17 so that drop-off occurs, permitting the control lever 19 to rock clockwise under the urging of the biasing spring 22, thereby freeing the resilient vibratory element 24 of the alarm system for actuation by A.-C. flux from a pair of auxiliary poles 25, 26 formed as integral parts of the pole structure of the drive motor 10. This is the position shown in FIGS. 2 and 3. In the particular embodiment illustrated, the vibratory element 24 is a reed having its upper end fixed by riveting it to an integral lug 29 on the top of the mounting plate 11, so that the lower end of the reed is free for vibratory movement in response to the driving impulses set up by the A.-C. flux from the auxiliary poles 25, 26.

In accordance with the present invention, the reed or other resilient vibratory element carries a striker for striking a bell when the resilient element is vibrated at a predetermined amplitude, and a permanent magnet is mounted on the resilient vibratory element for cooperation with the A.-C. flux from the synchronous motor for applying driving impulses to the resilient element at the same frequency as that of the alternating current energizing the drive motor. Thus, in the illustrative embodiment, a striker element 30 mounted on the free lower end of the reed 24 thereof strikes a bell 31 once during each cycle of the oscillatory motion of the reed. The bell 31 is preferably mounted on the mounting plate 11 directly below the motor 10.

For the purpose of applying periodic driving impulses to the reed 24 at the same frequency as that of the A.-C. flux from the auxiliary poles 25, 26, a permanent magnet 32 is mounted on one side of the reed directly opposite the poles 25, 26. The alternating magnetic flux in the air gap between thes poles 25, 26 and the reed 24 attracts the permanent magnet 32 toward the poles 25, 26 during one half of each cycle of the A.-C. flux, and repels the magnet during the other half cycle. Consequently, it can be seen that the alternate attraction and repulsion of the permanent magnet 32 toward and away from the poles 25, 26 due to the alternating magnetic flux tends to vibrate the reed 24 at the same frequency as that of the A.-C. current which energizes the synchronous motor 10.

In a conventional alarm buzzer actuated by alternating flux from a synchronous drive motor, the vibrating reed is driven at a frequency twice as fast as that of the A.-C. supply. For example, with the usual 60 cycle supply, the vibrating element is driven at 120 vibrations per second, or 7200 vibrations per minute. This relatively high frequency produces an unpleasant buzzing sound, as opposed to the more desirable bell sound produced at the low frequency output provided by the present invention. Thus, in the illustrative vibratory system, driving impulses are applied to the reed 24 at the same frequency as that of the A.-C. supply, so that with a 60 cycle supply, the reed is driven at a rate of 60 pulses per second. In other words, the normal frequency of the driving impulses in a buzzer-type alarm is divided by two.

To reduce the frequency of the oscillating striker 32 still further, the vibratory system may be designed to have a natural frequency of oscillation even lower than that of the driving impulses, preferably a sub-multiple of the frequency of the driving impulses. The vibratory system must also have an amplitude considerably larger than that of the driving impulses, so that the driving impulses are in effect superimposed on the natural oscillatory motion of the vibratory system to act as a synchronizing signal, as well as serving as a power input to sustain the vibratory movement of the reed. The natural frequency of the vibratory system is determined primarily by the dimensions and resiliency of the vibratory reed 24, and the weight and location of the permanent magnet 32 and the striker element 30 which are mounted on the reed. As will be apparent to those familiar with this art, the reed 24, the permanent magnet 32, and the striker element 30, which are the three main elements of the spring mass system in the illustrative embodiment, may be varied in their relative dimensions, physical configurations, and materials of construction to provide a natural oscillatory motion of practically any desired frequency and amplitude. For example, the driving frequency of 60 cycles per second effected by the cooperation of the permanent magnet 32 with the A.-C. flux may be reduced to a striking frequency of 30 cycles per second, which produces a pleasant bell sound, by designing the spring mass system to have a natural frequency of 30 c.p.s. Since the frequency of the driving impulses is already reduced to 60 c.p.s. by the permanent magnet 32, the driving impulses are extremely effective in synchronizing the natural motion of the spring mass system at the desired frequency.

The effect of the permanent magnet on the overall operation of the electromagnetic vibrator when used as an alarm striker will be more clearly understood by referenct to the waveforms in FIGURE 4. Thus, waveform A represents the A.-C. flux generated by the auxiliary poles 25, 26, which has the same waveform as the motor signal A but is 90° out of phase therewith. This A.-C. flux continually retracts and repels the permanent magnet 32 so as to apply driving impulses to the reed as represented by waveform B in FIGURE 4. It can be seen that the driving impulses have exactly the same 60 cycle frequency as, and are in phase with, the A.-C. flux from the auxiliary poles. The vibratory motion of the reed 24 is represented by waveform C in FIGURE 4; thus, the striker element 30 strikes the alarm bell 31 at each of the three peaks $C_1$, $C_2$ and $C_3$, which occur at a frequency of 30 cycles per second, i. e., the same as the natural frequency of the mechanical resonant system comprising the reed 24, the striker element 30, and the permanent magnet 23. By comparing waveforms B and C, it can be seen that the strikes occur in synchronism with, but at half the frequency of, the driving impulses applied to the reed due to the cooperation of the permanent magnet 32 with the A.-C. flux generated by the synchronous motor. Since the frequency of the driving impulses is twice as great as the natural frequency of the vibratory system, intervening pulses represented by peaks $C_a$ and $C_b$ in waveform C are also superimposed on the vibratory motion of the reed; however, these impulses are applied exactly halfway between successive striking peaks $C_1$, $C_2$, or $C_2$, $C_3$, i.e., when the striker element 30 is farthest away from the bell 31, so that they do not give rise to secondary strikes of the bell between the primary strikes represented by peaks $C_1$, $C_2$ and $C_3$.

As can be seen from the foregoing detailed description, the present invention provides an improved frequency dividing electromagnetic vibrator which provides a reliable and accurate frequency division to provide a consistent low frequency output that can be used to attain a pleasant bell sound in an alarm system. Even where the driving impulses are applied to the vibratory system at a frequency greater than the desired output frequency, i.e., greater than the striking frequency, the impulses which are applied between strikes occur when the vibratory element is farthest removed from the striking position, so that the electromagnetic vibrator system is capable of maintaining the desired frequency division in the face of variable operating conditions encountered in actual use. Moreover, the improved electromagnetic vibrator provided by this invention can be economically manufactured from only a few low-cost parts, since the permanent magnet is the only additional element required.

I claim as my invention:

1. In an alarm system for an electric clock driven by a synchronous motor which includes an auxiliary pole for generating alternating flux, an improved electromagnetic vibrator comprising the combination of a sounding element, a resilient vibratory element carrying a striker for striking said sounding element when the resilient element is vibrated, a permanent magnet mounted on said resilient element adjacent said auxiliary pole so that said permanent magnet is alternately attracted and repelled relative to said auxiliary pole by said alternating flux to apply driving impulses to said resilient element at the same frequency as that of the alternating flux.

2. In an alarm system for an electric clock driven by a synchronous motor which includes an auxiliary pole for generating alternating flux, an improved electromagnetic vibrator comprising the combination of a sounding element, a spring mass system having a natural oscillatory motion of predetermined frequency and amplitude and carrying a striker element for respectively striking said sounding element in accordance with said oscillatory motion, a permanent magnet operatively connected to said spring mass system adjacent said auxiliary pole so that said permanent magnet is alternately attracted and repelled relative to said auxiliary pole by said alternating flux to apply driving impulses to said spring mass system at the same frequency as that of the alternating flux.

3. An alarm system as defined in claim 1 in which said spring mass system has a natural frequency which is a sub-multiple of the frequency of said driving impulses so as to reduce the striking frequency to a sub-multiple of the frequency of the driving impulses.

4. In an alarm system for an electric clock driven by a synchronous motor which includes an auxiliary pole for generating alternating flux, an improved electromagnetic vibrator comprising the combination of a sounding element, a reed fixed at one end and carrying a striker at the other end for respectively striking said sounding element in response to vibratory motion of said reed, a permanent magnet mounted on said reed adjacent said auxiliary pole so that said permanent magnet is alternately attracted and repelled relative to said auxiliary pole by said alternating flux in synchronism with the alternating flux to vibrate the reed.

References Cited

UNITED STATES PATENTS

| | | | |
|---|---|---|---|
| 2,092,715 | 9/1937 | Grayson | 58—21.14 |
| 2,094,989 | 10/1937 | Koblhagen | 58—21.15 X |
| 2,562,734 | 7/1951 | Phaneuf | 58—38 |
| 2,752,592 | 6/1956 | Gallagher et al. | 58—19 X |
| 3,314,228 | 4/1967 | Bowden | 58—38 |

RICHARD B. WILKINSON, *Primary Examiner.*

LAWRENCE H. HAMBLEN, *Assistant Examiner.*

U.S. Cl. X.R.

58—19